No. 887,274. PATENTED MAY 12, 1908.
W. H. V. ROSING & F. L. GORDON.
BRAKE SHOE.
APPLICATION FILED MAY 3, 1907.
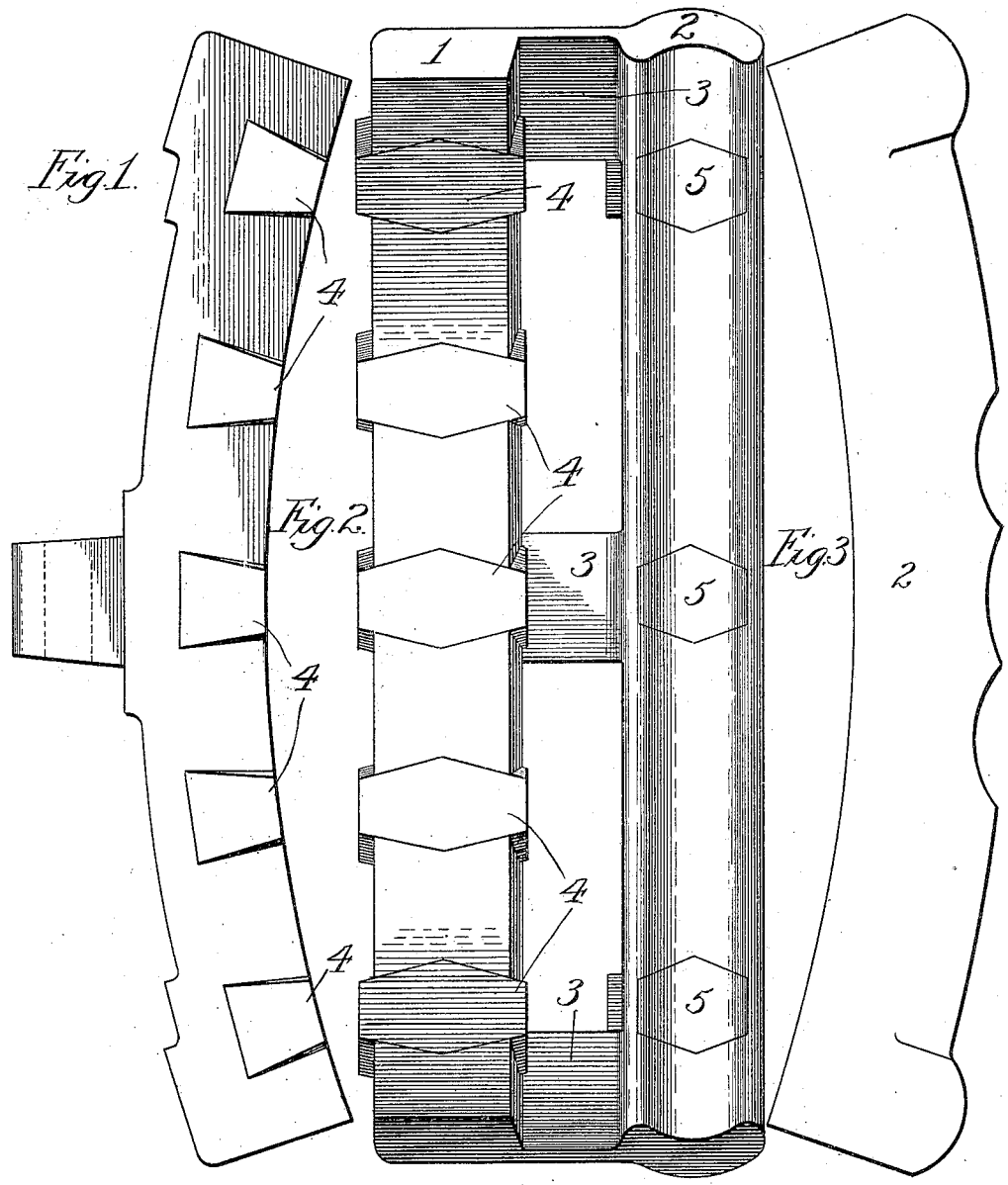
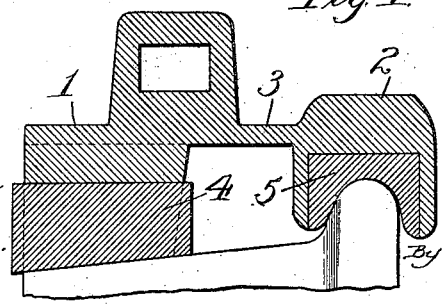
Witnesses:
John Enders
Chas. H. Buell
Inventors:
William H. V. Rosing
Frank L. Gordon,
By Sheridan & Wilkinson
Attys.

UNITED STATES PATENT OFFICE.

WILLIAM H. V. ROSING, OF ST. LOUIS, MISSOURI, AND FRANK L. GORDON, OF CHICAGO, ILLINOIS.

BRAKE-SHOE.

No. 887,274.

Specification of Letters Patent.

Patented May 12, 1908.

Application filed May 3, 1907. Serial No. 371,657.

*To all whom it may concern:*

Be it known that we, WILLIAM H. V. ROSING and FRANK L. GORDON, citizens of the United States, residing in the city of St. Louis, State of Missouri, and in the city of Chicago, county of Cook, and State of Illinois, respectively, have invented certain new and useful Improvements in Brake-Shoes, of which the following is a specification.

The object of our invention is to provide a brake shoe of such form and materials that the wheel to which it is applied will be worn down by the rail and brake shoe without altering the form of its contour. As is well-known this result is not attained by the brake shoes now in use, and it is, therefore, frequently necessary to take locomotives and cars out of service for the purpose of truing the wheels or fitting them with new tires. This results from the excessive wear of that part of the tire bearing upon the rail and from the projections formed by the flow of metal from below the brake shoe. When the distortion resulting from these causes reaches a certain limit, the wheels are liable to damage frogs and switches, thus rendering their further use very undesirable. It is in order to avoid the loss incident to retiring the rolling stock from service for the purpose of truing or replacing the tires that we have devised our improved brake shoe, which—as above stated—counteracts the uneven wear and irregularities referred to.

In the drawings—Figure 1 is a side view of a brake shoe constructed according to our invention. Fig. 2 is a view of the under side of the same. Fig. 3 is a view of the side opposite to that shown in Fig. 1. Fig. 4 is a cross sectional view of the brake shoe and of part of the wheel to which it is applied.

The brake shoe illustrated is of the general form covered by our Patent No. 832,813, granted October 9, 1906, and consists of a tread-bearing part 1 and a flange-bearing part 2 connected by bridges 3. The bridges 3 form the sole connection between the two parts of the brake shoe, the spaces between the bridges being open. The body of the brake shoe is preferably constructed of cast steel, and is provided upon its bearing surface with insets 4 and 5, preferably of gray iron. The insets 4 in the tread-bearing part of the brake shoe are of slightly greater width than the main body of the tread-bearing part. The insets 5 in the flange-bearing part of the brake shoe are of substantially the same width as that part of the shoe. It may not in all cases be found necessary to provide insets in the flange-bearing part of the brake shoe, and my invention is not to be considered as limited to the use of insets in both parts of the brake shoe, but as covering broadly the construction set forth in the appended claims.

In operation, our improved brake shoe wears the tires down substantially uniformly and without distorting the contour thereof, the projecting ends of the insets 4 serving to remove the irregularities in the tire ordinarily formed at either side of brake shoes of ordinary construction. This advantageous action is believed to be in part due to the fact that the cast iron insets 4 have a less abrasive action upon the tire than the steel body 1 thereof, the result being that the insets 4 cut away the irregularities due to the action of the body part 1, but do not themselves give rise to the formation of such irregularities. The cutting action of the tread-bearing part of the brake shoe, when formed according to our invention, is sufficient to cut down the part of the tire upon which it bears to an extent equal to the wear caused by the rail and flange-bearing part of the brake shoe upon the remainder of the wheel thus preserving the contour of the tread in substantially its original form.

What we claim is—

1. A brake shoe comprising a tread-bearing part, and insets of a different material in said tread-bearing part, said insets being of greater width than the remainder of said tread-bearing part.

2. A brake shoe comprising a tread-bearing part, and insets of a less abrasive material in said tread-bearing part, said insets being of greater width than the remainder of said tread-bearing part.

3. A brake shoe comprising a cast steel tread-bearing part, and cast iron insets in said tread-bearing part, said insets being of greater width than the remainder of said tread-bearing part.

4. A brake shoe comprising a flange-bearing part and a tread-bearing part separated by a space opposite the rail wearing part of the wheel, insets in said tread-bearing part of greater width than the remainder of said tread-bearing part, and bridges uniting said flange-bearing and tread-bearing parts.

5. A cast steel brake shoe body comprising a flange-bearing part and tread-bearing part separated by a space opposite the rail wearing part of the wheel, bridges connecting said tread-bearing and flange-bearing parts, and cast iron insets in said tread-bearing and flange-bearing parts, the insets in the tread-bearing part being of greater width than the remainder thereof.

6. A brake shoe comprising a bearing part, and insets of a different material in said bearing part, said insets being of greater width than the remainder of said bearing part.

WILLIAM H. V. ROSING.
FRANK L. GORDON.

Witnesses as to William H. V. Rosing:
CHARLES F. McCUEN,
ROY R. ROOT.

Witnesses as to Frank L. Gordon:
WALTER A. SCOTT,
THOMAS F. SHERIDAN.